Dec. 21, 1965 E. M. ALLEN ET AL 3,224,836
PROCESS FOR PRODUCING TITANIUM OXIDE PIGMENTS
Filed June 25, 1963 2 Sheets-Sheet 1

INVENTORS
EDWARD M. ALLEN and
FLOYD E. BENNER, JR.
BY
Oscar L Spencer
ATTORNEY

United States Patent Office 3,224,836
Patented Dec. 21, 1965

3,224,836
PROCESS FOR PRODUCING TITANIUM
OXIDE PIGMENTS
Edward M. Allen, Doylestown, and Floyd E. Benner, Jr., Wadsworth, Ohio, assignors to Pittsburgh Plate Glass Company, Pittsburgh, Pa., a corporation of Pennsylvania
Filed June 25, 1963, Ser. No. 290,558
7 Claims. (Cl. 23—202)

This application is a continuation-in-part of United States application Serial No. 15,300 filed March 16, 1960, now United States Letters Patent 3,105,742.

This invention is for improvements in the preparation of metallic oxides such as titanium dioxide by the thermal decomposition of a titanium halide, notably titanium tetrachloride, in the presence of oxidizing gases.

In accordance with the present invention, a novel method of heating the reactants, maintaining adequate temperature in the reaction zone, and carrying out the thermal decomposition reaction to produce a fine product of pigmentary grade is provided. Further, the heat input is recovered in the form of a useful by-product of the reaction.

According to one embodiment of this invention, titanium tetrachloride and air or an oxygen containing gas, or a mixture of air and oxygen are mixed and preheated to a temperature above the dew point of $TiCl_4$, but below that at which titanium tetrachloride reacts with oxygen, or below about 600° C., and preferably between about 200° C. and 400° C. The titanium tetrachloride is caused to react by suddenly increasing the temperature of the mixture to a point where the oxidation of $TiCl_4$ will occur, or between about 600° C. and 1500° C., and preferably between about 800° C. and 1200° C.

This increase in temperature is brought about in several ways. Thus, a film of the mixed gas in jet form may be subjected to a flame produced by burning a sulfur containing material with air or oxygen or a mixture of the two. In the preferred embodiment of the invention, an ignitible vapor mixture of $TiCl_4$, oxygen containing gas, and sulfur containing material pre-heated to the described temperature is established, and this mixture is passed through a burner suitable to cause the ignitible mixture to burn with a stable flame to raise the temperature of the mixture above that at which oxygen reacts with titanium tetrachloride to thereby produce a suspension of finely divided titanium dioxide in resulting reaction gases.

According to another embodiment of the present invention, a bed of inert particulate solid material bounded at the top by an empty space reaction zone is established. The solids are maintained in an expanded, fluidized or dynamic state by passing a stream or streams of $TiCl_4$ and an oxygen containing gas upwardly through the bed. A sulfur containing material is also projected into the bed. The temperature of the bed is maintained just below that at which titanium tetrachloride decomposes or below about 600° C., and preferably between about 450° C. and 600° C., by regulating the oxidation of the sulfur containing material in the bed. The various reactant and reaction product streams mix in the bed, and the resulting mixture is projected into the space above the bed, where additional oxidation of the sulfur containing material occurs and raises the temperature of the mixture above that at which $TiCl_4$ oxidizes, or between about 600° C. and 1500° C., preferably between about 800° C. and 1200° C. A hot mixture of finely divided pigmentary $TiO_2$ is produced in resulting reaction gases including $Cl_2$, $SO_2$, and, depending upon the amount of oxygen present in the mixture, $SO_3$. The sulfur containing material, depending upon its properties, may be fed into the bed as a finely divided solid or a liquid. Preferably, it is fed to the bed as a vapor. Additionally, the combustible sulfur containing material may be fed both to the fluid bed, and also to the space above the bed. In this embodiment, the $TiCl_4$ may be introduced into the bed as a liquid, or as vapor at about its boiling point or higher.

The sulfur containing materials contemplated for use herein include elemental sulfur, and sulfur compounds such as sulfur monochloride, $S_2Cl_2$, sulfur dichloride, $SCl_2$, sulfuryl chloride, $SO_2Cl_2$, thionyl chloride, $SOCl_2$, sulfur bromide, $S_2Br_2$, sulfur iodide, $S_2I_2$, and so forth. Further, when the reactants are passed through a fluidized bed, the bed itself could contain sulfur, or a sulfur bearing ore, in which case the bed would itself serve as the source of at least a portion of the sulfur containing material required by the system.

Thus, in this invention, metal oxides, notably titanium oxides, are produced by reacting oxygen with titanium tetrachloride or other titanium tetrahalide in the hot gaseous reaction products produced by burning a sulfur-containing compound, e.g., sulfur or sulfur halide in the presence of oxygen. Sufficient sulfur-containing compound is burned to generate heat for initiating and sustaining the reaction of titanium tetrahalide with oxygen.

The invention will be described in connection with the accompanying drawings, in which.

Figure 1:
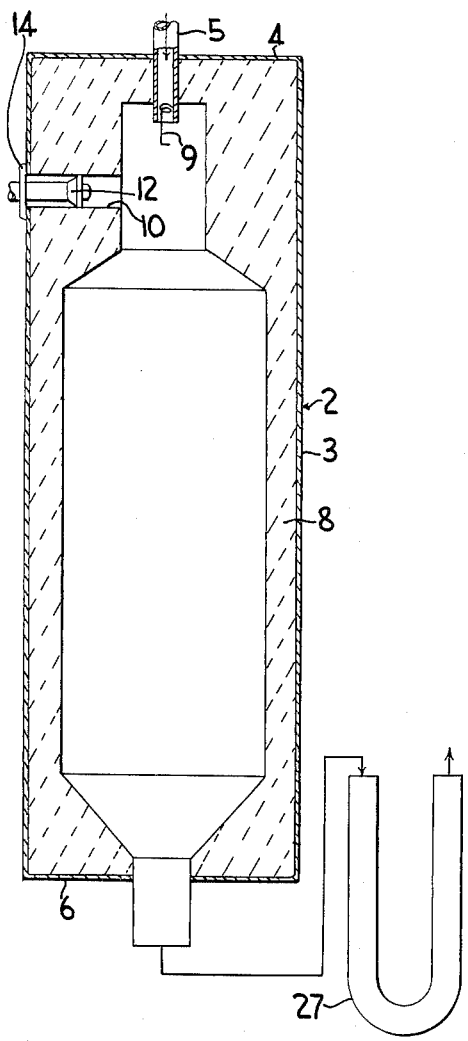
FIGURE 1 is a cross-sectional view of one form of reactor which may be used in carrying out the present invention.

In carrying out this invention in the apparatus shown in FIGURE 1, a furnace is provided which comprises essentially a vertical reactor 2 consisting of an elongated steel column 3 having a cover 4 and a floor 6. Reactor 2 is provided with a port 10 adapted to receive a burner 12 which is mounted in face plate 14. The reactor is lined with fire brick as indicated at 8. Centrally disposed in cover 4 is a reactant feed tube 5 which may be a concentric type nozzle or a straight tube.

In starting up the reactor, a fuel mixture such as carbon monoxide, natural gas, and so forth, is fed through burner 12 and ignited. Burner 12 is operated until the reactor is preheated to a temperature about which titanium tetrachloride reacts with oxygen. When adequate preheat temperature is reached, an ignitible vapor mixture of titanium tetrachloride, oxygen, and a sulfur containing material such as a sulfur halide is fed through tube 5 into the space within the upper portion of reactor 2 as indicated in the drawing. Upon contacting the flame produced by burner 12, the feed mixture is ignited and the heat released by the burning sulfur containing material heats the reactant mixture to a temperature high enough to cause the $TiCl_4$ to react with oxygen. Once the flame is started, it is self-sustaining. Therefore, burner 12 may be and is gradually turned off. As is readily apparent, in addition to serving as a reactor preheater, burner 12 also acts as a pilot light at start-up to ignite the sulfur containing material in the reaction mixture.

In employing a feed tube such as is shown at 5 in FIGURE 1, it is desirable to use a flame holder. This may conveniently take the form of a thin wire inserted into the bottom of the tube, and projecting a short distance in front of the tube, as is shown at 9.

A hot suspension of $TiO_2$ is withdrawn from the bottom of the reactor as indicated by the arrow and fed into a recovery system 27 in which the chlorine, $TiO_2$ and the sulfur oxides are separated. This portion of the process will be more fully described hereinbelow.

In carrying out the reaction in the hereinabove described manner, it is important that a reaction mixture be established which, when projected into the reactor, will burn with a stable flame. To produce this desired result, the molar ratio of the combustible sulfur containing material to TiCl$_4$ in the reaction mixture should be above about 0.5 and preferably above about 0.8. On a weight basis, the amount of sulfur containing material in the mixture should be above about 30 percent, and preferably above about 60 percent by weight based upon the weight of titanium tetrachloride in the mixture. The quantity of oxygen in such a mixture should be in excess of about 25 percent and preferably in excess of about 80 percent of that theoretically required to react with the sulfur containing material and TiCl$_4$ in the mixture.

Although the sulfur containing material has been described as being premixed with titanium tetrachloride and oxygen to produce a resulting reaction mixture which will burn with a stable flame, other modes of handling the sulfur containing material are contemplated. Thus, an ignitible mixture of the sulfur containing material may be fed to the reactor as a separate stream and ignited within the reactor to produce a stable flame. A mixture of titanium tetrachloride and oxygen in the form of a relatively thin film or stream may then be projected into the flame. Alternatively, separate streams of titanium tetrachloride and oxygen may be projected into the stable flame. Also, if desired, all of the oxygen required to oxidize both the titanium tetrachloride and the sulfur containing material may be fed to the reactor with the ignitible mixture of the combustible sulfur containing material. In this modification, additional oxygen need not be introduced into the reactor with the titanium tetrachloride stream.

In carrying out the process by projecting titanium tetrachloride into a stable flame produced by burning an ignitible mixture comprising a sulfur containing material, the oxygen content of the ignitible mixture should be substantially in excess of that theoretically required to react with the sulfur containing material. More particularly, when sulfur halide or sulfur is employed as the sulfur containing material, the oxygen content of the ignitible mixture should be at least about 25 percent, and preferably about 80 percent in excess of that theoretically required to react with the sulfur content. Additionally, to insure good flame stability, and also to provide adequate heat to raise the temperature of the TiCl$_4$ feed to reaction temperature, the molar ratio of the combustible sulfur containing material, such as elemental sulfur and sulfur halides, in the ignitible mixture to the titanium tetrachloride fed to the flame should be above about 0.5 and preferably above about 0.80. On a weight basis, the sulfur containing material in the ignitible mixture fed to the reactor should be at least about 30 percent and preferably at least above 60 percent by weight of the titanium tetrachloride contacting the flame produced by the ignitible mixture.

In this modification, the flame may be established in a number of ways. Thus, the ignitible mixture of sulfur containing material and oxygen or oxygen containing gas may be fed through a burner situated like that shown at 10 in FIGURE 1. Also, the ignitible mixture may be fed through a concentric tube surrounding the titanium tetrachloride feed tube. Other ways of establishing the stable flame and contacting the titanium tetrachloride stream therewith will be obvious to those skilled in the art.

In the embodiments described with respect to FIGURE 1, it should be understood that the temperature of the titanium tetrachloride fed to the reactor is below that at which this material reacts with oxygen. Thus, the temperature of the titanium tetrachloride feed is below about 600° C., and preferably below about 400° C., or between about 200° C. and 400° C. When the titanium tetrachloride feed is mixed with the oxygen or oxygen containing gas and/or the combustible sulfur material, the temperature of the feed mixture will be the same as that described for titanium tetrachloride. When separate streams of titanium tetrachloride and oxygen are fed to the stable flame produced by burning an ignitible mixture of the sulfur containing material, the temperature of the oxygen stream may vary from about room temperature to about 600° C., or higher, while the temperature of the titanium tetrachloride is the same as that heretofore described. Of course, in the modification where all the oxygen required to react with the titanium tetrachloride is fed to the reactor with the ignitible mixture used to produce the ignitible flame, the temperature of the oxygen when contacted with the titanium tetrachloride will be at or about the temperature of the flame, and hence considerably above that at which the titanium tetrachloride reacts with oxygen. In any of the modifications described, flame temperatures of 600° C. to 4000° C. or higher are contemplated.

Although in FIGURE 1, the titanium tetrachloride is shown as being fed vertically downward into the top of the reactor, other methods of feeding the titanium tetrachloride are contemplated. For example, the reactor may be turned on its side and the titanium tetrachloride feed mixture fed horizontally. Also the titanium tetrachloride feed mixture may be fed upwardly into the reactor, and the reaction product removed from the top of the reactor. Further, the titanium tetrachloride feed mixture may be fed laterally through the side of the reactor. Other methods of feeding will be obvious to those skilled in the art.

Figure 2:
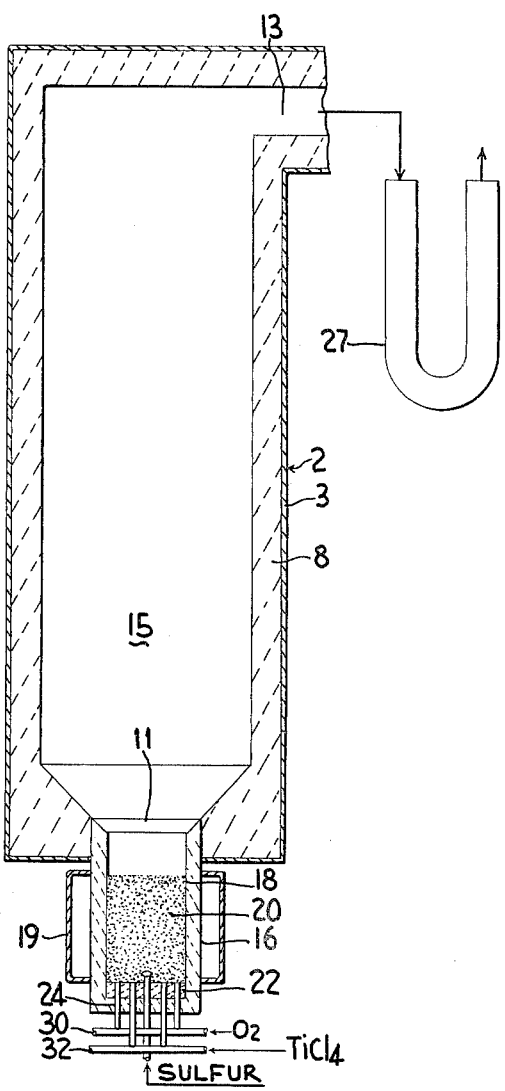
FIGURE 2 is a cross-sectional view of a modified reactor.
Figure 3:
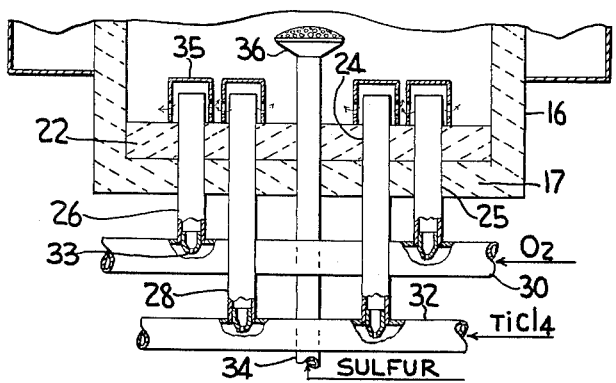
FIGURE 3 is a scaled-up view of the bottom of the reactor shown in FIGURE 2.

In carrying out another embodiment of the present invention, the apparatus shown in FIGURES 2 and 3 is employed. As is shown therein, a vertical reactor 2 consisting of an elongated steel column 3 lined with fire brick 8 is provided with a centrally disposed inlet 11 at its bottom and an outlet 13 at its top. Attached to inlet 11 and communicating with the interior 15 of reactor 2 is a smaller, vertically aligned column 16, containing a fluidized bed of inert particles 20. Column 18 is provided with a cooling jacket 19 which may be used to regulate the temperature of the bed. Although a cooling jacket is shown, it should be understood that a wide variety of other conventional heat exchange means, for example, cooling coils, may also be employed.

Supporting the bed at the bottom of column 16 is a refractory slab 22 having a plurality of perforations 24 aligned with a plurality of perforations 25 in the bottom 17 of column 16. A plurality of conduits 26 and 28 extend through the perforations and communicate with the bed. Conduits 26 at their lower end communicate with a wind box 30 containing oxygen. Conduits 28 at their lower ends enter wind box 32 containing titanium tetrachloride. Conduits 26 and 28 are fitted at their lower ends with restricted pressure drop orifices 33 to provide a pressure drop between the wind boxes and the conduits, and at their upper ends with shields 35 to prevent dropping of the particles of the bed into the conduits, as is more clearly shown in FIGURE 3. In order to obtain uniform fluidizing conditions in the bed, the size of orifices 33 and the depth of the bed are adjusted so that the pressure drop across the orifices is uniform and equal to at least about one half the pressure drop across the bed. Preferably the size of these orifices is such as to provide a pressure drop between the wind box and conduits of at least 2 p.s.i.g.

Centrally disposed in the bottom of column 18 is a conduit 34 which extends through the refractory slab and into the bed. Conduit 34 is fitted at its upper end with a nozzle 36 and at its lower end communicates with a supply of sulfur containing material.

Vertical reactor 2 is preheated by passing a gaseous fuel mixture such as carbon monoxide, methane, natural gas and so forth through the bed via either conduit 26 or 28, or both, and igniting the fuel above the bed. Preheating is continued until the temperature of space 15 within reactor 2 is above 600° C. and preferably between about 800 and 1200° C. Burning of the fuel above the bed will of course heat the bed itself, and the cooling jacket 19 is used to keep the temperature of the bed below about 600° C., or between about 450 and 600° C.

When adequate preheat temperature is reached, a stream of a sulfur-containing material is fed to the bed via conduit 34 and the fuel supply is gradually turned off. If the sulfur containing material is in the form of a readily volatile compound such as $S_2Cl_2$ or $SCl_2$, it is preferably fed as a vapor mixed with air or an oxygen containing gas. If the source of sulfur used is elemental sulfur, this is preferably fed to the bed as a vapor either alone or mixed with oxygen, air, or other oxygen containing gases. Adequate supplies of oxygen or an oxygen containing gas and titanium tetrachloride are maintained in wind boxes 30 and 32, respectively, and these reactants are fed to the bed via conduits 26 and 28, respectively. The rate of flow of the reactants through the bed may vary between about 2 and 10 times the minimum fluidizing velocity. The rate of flow of the sulfur stream is regulated to cause sufficient oxidation of the sulfur containing material in the bed to maintain the temperature of the bed just below that at which titanium tetrachloride reacts with oxygen. Additional temperature control of the bed may be obtained, if needed, by auxiliary cooling means, such as the cooling jacket described hereinabove. By maintaining the described conditions, the oxygen and $TiCl_4$ are preheated in passing through the bed to a temperature just below that at which the $TiCl_4$ decomposes to form $TiO_2$. The temperature of the bed, therefore, is maintained just about at the threshold at which $TiCl_4$ reacts with oxygen.

The gases mix in the bed, and the resulting mixture, which comprises $TiCl_4$, $O_2$, unreacted sulfur containing material, $SO_2$, $SO_3$, and inerts such as nitrogen, is projected into space 15 from the top of the bed. Oxidation of the non-oxidized portion of the sulfur containing material in the mixture occurs above the bed in space 15 within reactor 2, and the heat evolved raises the temperature of the $O_2$ and the $TiCl_4$ up to or above reaction temperature, thereby causing thermal decomposition of the $TiCl_4$ to produce a hot mixture of titanium dioxide particles in resulting reaction gases. The hot mixture is withdrawn through outlet 13 and sent to recovery vessels as indicated at 27.

The composition of the mixture leaving the bed may be such that it supports a stable flame in the reaction zone above the bed. In this event, the feed to the bed should be regulated so as to produce a hot mixture emanating from the bed which has the relative proportions of combustible sulfur containing material, $O_2$ and $TiCl_4$ described hereinabove in connection with the embodiment shown in FIGURE 1.

By carrying out the process in the above-described manner, the temperature in the bed is kept below about 600° C., or between about 400 and 600° C., and the temperature above the bed in reaction space 15 is maintained between about 600° C. and 1500° C., and usually between about 700° C. and 1200° C.

The dynamic bed, in addition to serving as a very effective preheat zone, is also highly advantageous from the standpoint of feeding the reactants into the empty space above the bed. Thus, the constantly moving particles of the bed continuously rub against the surfaces surrounding inlet 11 and keep these surfaces free of titanium dioxide. Heretofore, feeding of $TiCl_4$-$O_2$ reaction mixtures into an empty space for reaction therein was plagued by clogging of the feed tubes due to formation of crystalline titanium dioxide at the openings of the feed tubes into the empty space.

Although in the above-described embodiment, all of the $TiCl_4$ and oxygen are described as being fed to the bed, the instant process contemplates introduction of all or a portion of the $TiCl_4$ and oxygen into the space above the bed. Thus, for example, a mixture of sulfur containing material and oxygen may be fed to the bed and oxidized therein to form a mixture of hot combustion products of sulfur which are withdrawn from the upper level of the bed and fed to an empty space reaction zone above the bed. Titanium tetrachloride or a mixture of titanium tetrachloride and an oxygen containing gas, or separate streams of titanium tetrachloride and an oxygen containing gas, may be fed into the reactor at a point above the bed, so that the titanium tetrachloride contacts the hot combustion gases leaving the bed to thereby cause thermal decomposition of the titanium tetrachloride and form titanium dioxide. Also, if desired, additional sulfur containing material may be fed into the space above the bed to keep the temperature of this space above that at which titanium tetrachloride reacts with oxygen. Obviously, in this embodiment care does not have to be taken to insure that the temperature of the bed does not rise above the $TiCl_4$-$O_2$ reaction temperature.

Although in the operation of the apparatus of FIGURES 2 and 3, hereinabove described, reaction of the titanium tetrachloride in the bed is substantially prevented, it should be understood that all or a portion of the titanium tetrachloride oxidation can be caused to take place within the bed. In this embodiment, sufficient sulfur containing material is oxidized in the bed to maintain the temperature of the bed high enough to cause the titanium tetrachloride to react with oxygen in the bed, or between about 600° C. to 1500° C. In carrying out the process in this manner, it has been found particularly advantageous to avoid high bed temperatures, and to keep the bed at a temperature just high enough to cause the oxidation of titanium tetrachloride to occur. Thus, the temperature of the bed is preferably maintained below about 800° C., and preferably below about 700° C., or between about 600° C. and 700° C. By keeping the temperature of the bed, and consequently the temperature of the inert particles constituting the bed low, it has been discovered that the titanium dioxide formed in the bed has a reduced tendency to adhere to the inert particles. This has the effect of reducing the amount of titanium dioxide retained in the bed, thereby leading to enhanced yields.

In carrying out the reaction using the low bed temperatures described, a considerable portion of the titanium tetrachloride passes through the bed unreacted, and reacts above the bed. Usually amounts of titanium tetrachloride up to 25 percent and even up to 75 percent by weight of the quantity of titanium tetrachloride introduced into the bed may escape from the bed unreacted. The incompleteness of the reaction is largely attributable to the low temperature of the bed. In other words, because of the low temperature of the bed, all the titanium tetrachloride introduced to the bed does not react in the bed to form titanium dioxide, as is ordinarily the situation when high bed temperatures, e.g., 800 to 1200° C., are employed. Accordingly, a portion of the titanium tetrachloride escapes from the bed unreacted. To further reduce bed retention, the rate of flow of titanium tetrachloride to the bed may be varied to insure that a portion thereof escapes from the bed unreacted. In other words, the titanium tetrachloride may be fed to the bed so rapidly that emergence from the bed of a portion of the titanium tetrachloride unreacted is assured.

The unreacted titanium tetrachloride escapes from the bed mixed with unoxidized sulfur containing material, oxygen, $SO_2$, $SO_3$, and inert gases. Oxidation of the unoxidized sulfur containing material occurs and increases the temperature of the mixture in the reaction space above the bed, thereby causing the unreacted titanium tetrachloride to react above the bed in the manner described hereinabove.

In carrying out the reaction in this manner, the problem of bed retention of titanium dioxide generated in the bed is avoided because little if any reaction occurs in the bed.

The preferred material comprising the fluid bed in any of the described embodiments constitutes solid particles large in total area but small in continuity which are capable of being substantially maintained in a fluidized condition. The selection of solid surfaces to be used for the fluidized bed will be related to various characteristics which will include resistance to attack under the conditions of operation, comparatively high bulk density which is associated usually with massive rock formations usually found in sandy materials, the relative hardness of the material selected, and the range of particle sizes. Suitable materials are silica, aluminum, zircon and rutile which have preferably been selected from mineral sources which have previously undergone treatment, where necessary, with chlorine at high temperatures in order to remove any undesirable impurities. Other suitable solid heat resistant materials including particle of titanium dioxide, either alone or in admixture with another material, may be used.

Figure 4:
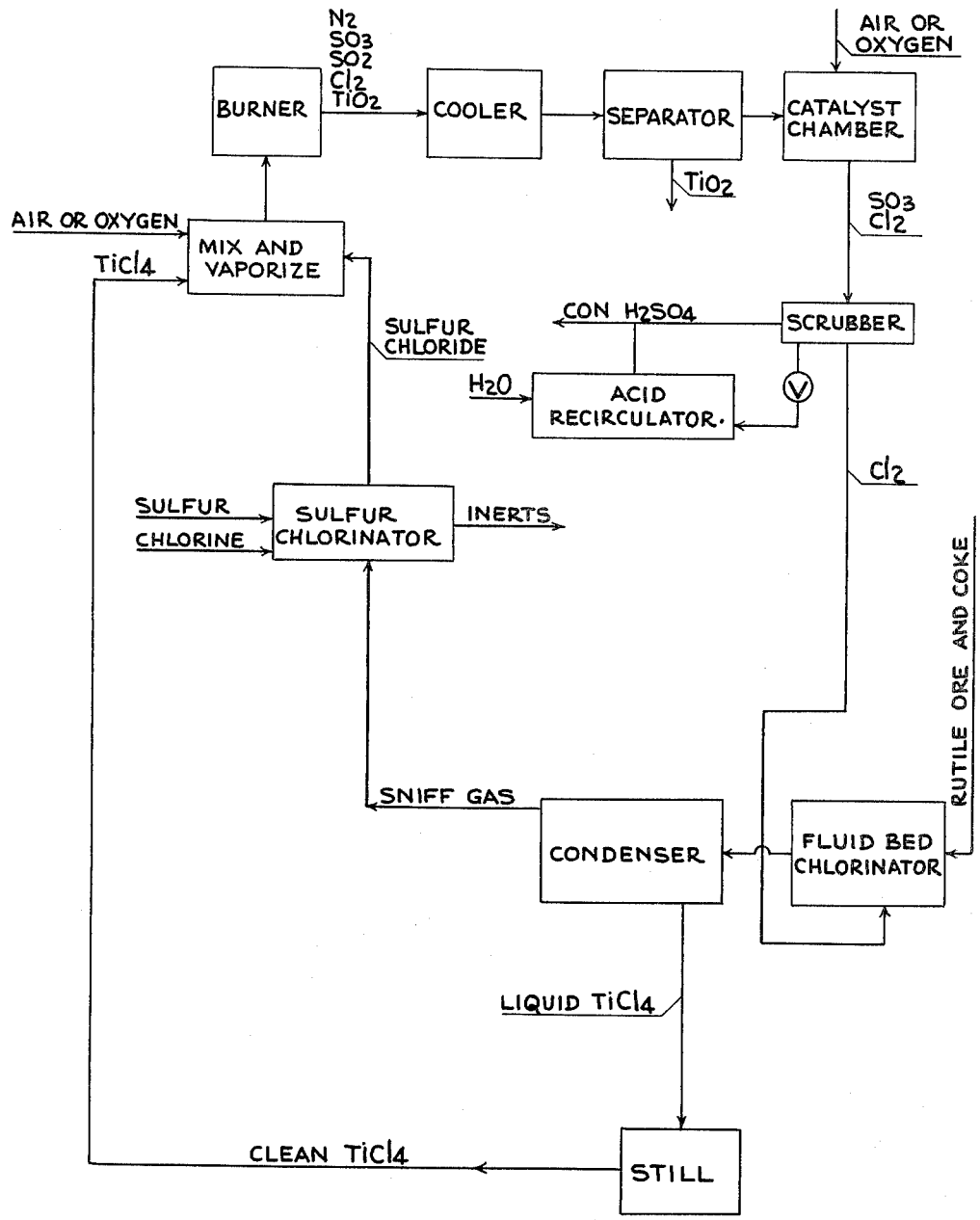
FIGURE 4 is a flow sheet of a cyclic process which may be used in carrying out the present invention.

The hot reaction mixture produced by the vapor phase oxidation reactions herein described is processed to recover titanium dioxide, chlorine, and sulfuric acid according to the flow sheet shown in FIGURE 4. The flow sheet is for a process in which sulfur chloride, i.e., $S_2Cl_2$, $SCl_2$, is used as the combustible sulfur containing material. Air or oxygen or oxygen containing gas, or a mixture of air and oxygen is introduced into a vaporizer, where it is mixed with $TiCl_4$ and sulfur chloride which are also fed to the vaporizer. The resulting stream is fed to a burner, which may be, for example, that shown in FIGURE 1. The $TiCl_4$ and sulfur chloride are decomposed in the burner, and a resulting hot gaseous reaction suspension comprising $TiO_2$, $Cl_2$, $SO_2$, $SO_3$, and inert gas, such as nitrogen, is formed. The relative quantities of $SO_2$ and $SO_3$ in the stream will, of course, depend upon the quantity of oxygen in the stream fed to the burner. The higher the oxygen content of the burner feed stream, the higher the proportion of $SO_3$ to $SO_2$ that will be formed in the burner. The hot reaction product is fed to a cooler, which may be a spray tower, fluid bed cooler, or other conventional type of heat exchanger, where the hot mixture is cooled to a temperature, usually below 100° C. From the cooler, the mixture is sent to a separator, for example, a cyclone, where the $TiO_2$ is removed from the gases.

The gases from the separator, which comprise $Cl_2$, $SO_2$ and $SO_3$, and some oxygen in addition to inert gases, such as nitrogen, are then sent to a conventional catalyst chamber for conversion of $SO_2$ to $SO_3$. Air or oxygen is fed to the chamber to carry out the required oxidation. The product from the catalyst chamber is sent to a scrubber or water tower where the $SO_3$ is removed by scrubbing with an aqueous medium to form sulfuric acid. An acid recirculator may be used as shown to provide the wash liquor to the scrubber.

The gas stream from the scrubber comprises primarily chlorine and inerts and is sent to a fluid bed chlorinator where chlorination of a titanium bearing ore, for example, rutile, in the presence of a carbonaceous reducing agent, for example, coke, is carried out to produce titanium tetrachloride.

The reaction product gases from the chlorinator are fed to a condenser, where the titanium tetrachloride is separated from the gases. The sniff gas from the condenser, which contains small amounts of chlorine, is sent to a sulfur chlorinator, where the residual chlorine is removed by reaction with sulfur. The inert gases may then be withdrawn from the chlorinator and vented to the atmosphere. Sulfur and additional chlorine are charged to the chlorinator, and the sulfur chloride produced is fed to the vaporizer to start the cycle anew.

The condensed titanium tetrachloride is sent to a still for purification, and the clean titanium tetrachloride is also fed to the vaporizer.

It may be readily seen that the above cyclic process constitutes a very economical method of preparing titanium dioxide with no waste whatsoever of any of the reactants. Additionally, use of the sniff gas to chlorinate sulfur alleviates a serious problem of disposing of the waste gases from the process. Heretofore, the sniff gas, which was highly noxious because of its chlorine content, created a serious health hazard when vented to the atmosphere.

The invention will be more fully understood by reference to the following examples, which, though limited, are not intended to affect the scope of the present invention in any way.

EXAMPLE 1

This example is run using the apparatus shown in FIGURE 1. A Hoffman blower is used to maintain a vacuum in the entire system. A vacuum of 0.5 to 1.5 inches of water is maintained in the reactor during the run. A gaseous mixture containing 21.8 mole percent $TiCl_4$ and 78.2 mole percent $S_2Cl_2$ is vaporized using 100 p.s.i.g. steam and then preheated in a 3 foot long electrically heated section of a two inch pipe to a temperature of 350° C. Dried oxygen at room temperature is added to the vaporized mixture of $TiCl_4$ and $S_2Cl_2$ to give a resulting mixture containing 5.4 mole percent $TiCl_4$, 19.4 mole mole percent $S_2Cl_2$ and 75.2 mole percent oxygen. The resulting mixture is fed through a ¼ inch nozzle made of fused silica into the reaction zone, which is preheated in the manner described hereinabove to a temperature of 900° C. The reaction zone comprises a vertical reactor 80 inches in overall length which has an outside diameter of 42 inches and is lined with insulating fire brick 6 inches thick. The nozzle is modified by a flame holder, which comprises a piece of quartz rod inserted in the nozzle and bent so that it projects about ½ inch in front of the feed nozzle. The rate of feed of the resulting mixture is such as to provide 0.104 gram mole/min. of $TiCl_4$, 0.400 gram mole/min. $S_2Cl_2$ and 1.560 gram mole/min. $O_2$ to the reactor. The total rate of feed to the reactor is 2.064 gram moles/min. The oxygen in the mixture is above 70 percent in excess of that theoretically required to react with the $S_2Cl_2$ and $TiCl_4$ in the mixture. The mixture burns with a steady luminescent glow which appears to hang to the flame holder when observed through a sight glass. A hot mixture of $TiO_2$ in resulting reaction gases is withdrawn from the reactor through the outlet port, and the titanium dioxide is recovered.

The yield was 99 percent of the theoretical. The product has a tinting strength of 800 and a rutile of 17.7 percent before calcination. The particles of $TiO_2$ produced were very small, and has an average particle size of less than 0.1 micron. Electron microscope photographs showed the particles to be spherical. The product was calcined for a period of 30 minutes at a temperature of 700° C., and after calcination, had a tinting strength of 1620.

EXAMPLE 2

This run is made as a control in order to determine the minimum sulfur monochloride concentration of a reaction mixture which will support a stable flame. The reactor and burner conditions are the same as in Example 1. Feed conditions are established by fixing the quantity of $S_2Cl_2$ in the reaction mixture and increasing the $TiCl_4$ and $O_2$ content to a point where flame stability is impaired. Sufficient oxygen is always present in the mixture to provide an excess of 85.3 percent over that theoretically required to react with the $S_2Cl_2$ and the $TiCl_4$ present. The percentage of oxygen in excess of theoretical had previously been discovered to give optimum flame condition for the burning of sulfur monochloride and oxygen. The method of preparing the reaction mixture was the same as described in Example 1. The results obtained are tabulated in Table 1.

Table 1

| Run | TiCl₄ [1] | O₂ [2] | S₂Cl₂ [3] | $\frac{S_2Cl_2}{TiCl_4}$ [4] | $\frac{S_2Cl_2}{TiCl_4}$ [5] | Excess Oxygen [6] | Condition of Flame |
|---|---|---|---|---|---|---|---|
| 1 | 0.0908 | 0.861 | 0.187 | 2.03 | 1.47 | 85.3 | Stable flame anchored on flame holder. |
| 2 | 0.136 | 0.945 | 0.187 | 1.37 | 0.980 | 85.3 | Do. |
| 3 | 0.182 | 1.029 | 0.187 | 1.03 | 0.734 | 85.3 | Do. |
| 4 | 0.227 | 1.113 | 0.187 | 0.82 | 0.590 | 85.3 | Do. |
| 5 | 0.374 | 1.395 | 0.187 | 0.50 | 0.356 | 85.3 | Mixture would not burn to produce a flame. |
| 6 | 0.561 | 1.731 | 0.187 | 0.334 | 0.238 | 85.3 | Do. |

[1] Gram moles per minute fed to vaporizer.
[2] Gram moles per minute fed to preheater.
[3] Gram moles per minute fed to vaporizer.
[4] Moles S₂Cl₂/Moles TiCl₄ (Mole ratio).
[5] Grams S₂Cl₂/Grams TiCl₄ (Weight ratio).
[6] Percent oxygen in excess of that theoretically required to react with the TiCl₄ and S₂Cl₂ in the mixtures.

Table 1 shows that mixtures containing molar ratios of S₂Cl₂ to TiCl₄ of about 0.80 and above (weight ratios of S₂Cl₂ to TiCl₄ of about 0.60 and above) and about 85 percent oxygen in excess of that theoretically required to react with the S₂Cl₂ and TiCl₄ emit a stable luminescent glow which appears to hang to the flame holder, indicating that a stable luminescent flame is actually produced during the reaction. Table 1 also shows that mixtures containing molar ratios of S₂Cl₂ to TiCl₄ of about 0.50 and below (weight ratios of S₂Cl₂ to TiCl₄ of about 0.35 and below), and about 85 percent oxygen in excess of that theoretically required to react with the S₂Cl₂ and TiCl₄ do not emit a stable luminescent glow when projected into the reactor. Actually, during runs 5 and 6 the reactor is completely dark, and no light appears in the reaction zone area.

EXAMPLE 3

This example is run using the apparatus shown in FIGURES 2 and 3. Reactor 2 has an overall length of 80 inches and an outside diameter of 24 inches. The reactor is lined with fire brick six inches thick, thereby making the inside diameter of the reactor 12 inches.

Column 18, which is made of stainless steel lined with fire brick is 5 inches in diameter and 36 inches long. The top of the column is fitted into bottom inlet 11 of reactor 2 and the connection is sealed against leakage. Dowtherm C is passed through jacket 19 which surrounds column 18. The fluid bed 20 consists of silica sand having a grain size of 250 microns to 350 microns. The sand fills the column above the refractory slab 22 to a static height of 7 inches.

The bed is preheated to a temperature of 450 to 500° C. and the reactor to a temperature of 900 to 950° C. in the manner described hereinabove. Carbon monoxide is used as a preheat fuel, and the fuel mixture is passed through the bed at a rate high enough to maintain the particles in a fluidized state. With the bed and reactor so prepared, elemental sulfur vapor previously prepared is fed to tube 34. The carbon monoxide feed to the bed is gradually cut off, and feeding of TiCl₄ and O₂ is commenced.

TiCl₄ is vaporized using 100 p.s.i.g. steam and fed to the bed via wind box 32 and conduits 24 at a temperature of about 200° C. Dry oxygen at room temperature is fed to the bed via wind box 30, and conduits 26. The rate of flow of oxygen and TiCl₄ to the bed is high enough to maintain the bed in a dynamic state. The temperature of the bed is maintained between about 450° C. and 550° C. by regulating the rate of feed of the oxygen and sulfur stream to the bed, and by controlling the rate of flow and temperature of the cooling medium in the cooling jacket. The mixture of reaction gases produced in the bed escapes from the top of the bed and reacts within the space above the bed to form a hot mixture of TiO₂ in resulting reaction gases. The interior of the reactor, when observed through a sight glass, glows with a luminescent color in the area of the top of the bed, indicating that the sulfur is burning above the bed. The hot mixture of TiO₂ in resulting reaction gases is withdrawn from the top of the reactor, and sent to recovery.

The tinting strengths given in the examples were calculated by the Reynolds constant volume method as reported in American Ink Maker, volume 14, page 21 (1936).

Although the above examples were run at a vacuum of 0.5 to 1.5 inches of water, operation at atmospheric conditions or under pressure is also within the scope of this invention.

The present process, although described in connection with the manufacture of titanium dioxide, may also be used to produce finely divided white metal oxides of any of the metallic elements in Groups 3 and 4 of the periodic system which form volatile metal chlorides. Such metallic elements include silicon, zirconium, tin, lead, and so forth. In addition to chlorides, other volatile metal halides such as iodides, bromides and fluorides may be oxidized to white metal oxides using the herein described process. For example, although the preferred starting material for the manufacture of titanium dioxide is titanium tetrachloride, other titanium halides, e.g., the titanium tetrahalides (titanium tetraiodide, titanium tetrabromide, and titanium tetrafluoride) can be oxidized in accordance with this invention to produce titanium dioxide.

Various additives, such as metal chlorides, white metal oxides, chlorine, aromatic organic compounds, or water may be added to the reaction mixture in any of the hereinabove described embodiments to improve the pigment characteristics of the product. Thus, the oxides or halides of silicon, boron, aluminum, and so forth, may be pre-mixed with the reactant streams or introduced separately into the reaction zones in contact with the reactant streams in amounts ranging from about 1 to 20 mole percent, based upon the quantity of the primary volatile metal halide, for example, titanium tetrachloride, in the reaction mixture. Also, if desired, various metallic elements such as aluminum, silicon, tin, lead and so forth, which oxidize to form white metal oxides, may be pre-mixed with the reactant stream or separately introduced into the reaction zone in contact with the reactant stream in quantities ranging from about 1 to 20 mole percent based on the quantity of the primary volatile metal halide in the reaction mixture. The amounts of water and/or aromatic organic compounds, such as benzene, chlorobenzene, and so forth, which may be pre-mixed with the reactant stream or introduced separately into the reaction zone may vary between about 1 and 10 mole percent, based upon the quantity of the primary volatile metal halide in the mixture.

The above advantages and many others will be apparent to the skilled chemist or chemical engineer. Not only does the present invention contemplate within its scope

What is claimed is:

1. A method of preparing titanium dioxide which comprises burning a member of the group consisting of sulfur and sulfur halides in the presence of oxygen to produce a stream of hot, gaseous, reaction products thereof, adding titanium tetrahalide to the stream, reacting the titanium tetrahalide with oxygen in the stream, and recovering titanium dioxide from the stream.

2. The method of claim 1 wherein the oxygen is at least 25 percent in excess of that theoretically required to react with the member.

3. A method of preparing titanium dioxide which comprises burning an ignitible mixture of sulfur-containing material with oxygen in a fluidized bed, withdrawing a mixture of hot combustion products of sulfur from an upper part of the bed, feeding the combustion products to an empty zone above the bed, reacting titanium tetrahalide with oxygen in the zone, and recovering titanium dioxide from the zone.

4. The method of claim 3 wherein the oxygen reacted with the sulfur-containing material is at least 25 percent in excess of that theoretically required to react with the sulfur content.

5. A method for manufacturing pigmentary titanium dioxide and sulfuric acid which comprises burning an ignitible mixture of a sulfur-containing material and oxygen to produce a stream of hot, gaseous, reaction products thereof, the oxygen being at least 25 percent in excess of that theoretically required to react with the sulfur content of the mixture, adding titanium tetrahalide to the stream, reacting the titanium tetrahalide with oxygen in the stream to form a hot gaseous effluent suspension containing titanium dioxide, chlorine and oxides of sulfur, cooling the effluent, recovering the titanium dioxide, oxidizing the effluent gases to convert lower valence oxides of sulfur to $SO_3$, and scrubbing the $SO_3$ with an aqueous medium to form sulfuric acid.

6. The method of claim 5 wherein the sulfur-containing material is a member selected from the group consisting of elemental sulfur, sulfur monochloride, sulfur dichloride, sulfur bromide, and sulfur iodide.

7. A method of preparing titanium dioxide which comprises burning an ignitible mixture of sulfur-containing material with oxygen within a fluidized bed in a reactor, evolving the resulting mixture of hot combustion products from the bed up into an empty zone of the reactor above the bed, feeding titanium tetrachloride directly into the empty zone above the bed such that the titanium tetrachloride is heated by the hot products to oxidation temperature and reacted with oxygen in the zone whereby to produce titanium dioxide.

References Cited by the Examiner
UNITED STATES PATENTS 3,105,742   10/1963   Allen et al. _____ 23—202

MAURICE A. BRINDISI, *Primary Examiner.*